United States Patent
Debaud et al.

(10) Patent No.: US 7,829,634 B2
(45) Date of Patent: Nov. 9, 2010

(54) SCORCH-DELAYING COMPOSITION

(75) Inventors: Fabien Debaud, Lyons (FR); Jacques Kervennal, Lyons (FR); Alfredo Defrancisci, Lyons (FR); Olivier Guerret, La Tour de Salvagny (FR)

(73) Assignee: Arkema France, Colombes (FR)

( * ) Notice: Subject to any disclaimer, the term of this patent is extended or adjusted under 35 U.S.C. 154(b) by 626 days.

(21) Appl. No.: 11/575,103

(22) PCT Filed: Sep. 16, 2005

(86) PCT No.: PCT/FR2005/002295

§ 371 (c)(1),
(2), (4) Date: Nov. 2, 2007

(87) PCT Pub. No.: WO2006/032765

PCT Pub. Date: Mar. 30, 2006

(65) Prior Publication Data

US 2008/0051496 A1    Feb. 28, 2008

(30) Foreign Application Priority Data

Sep. 22, 2004 (FR) .................................. 04 10002

(51) Int. Cl.
*C08F 4/00* (2006.01)
(52) U.S. Cl. ...................... 525/204; 526/270; 526/263; 526/308; 526/311

(58) Field of Classification Search ................. 525/375, 525/374, 387, 204; 526/204, 270, 311, 308, 526/263

See application file for complete search history.

(56) References Cited

U.S. PATENT DOCUMENTS

| 3,202,648 | A | | 8/1965 | Latourette |
| 3,335,124 | A | | 8/1967 | Larson |
| 3,954,907 | A | | 5/1976 | Schober |
| 5,449,724 | A | * | 9/1995 | Moffat et al. ................ 526/204 |
| 5,552,502 | A | * | 9/1996 | Odell et al. .................. 526/234 |
| 5,945,492 | A | | 8/1999 | Robert |
| 6,653,409 | B2 | * | 11/2003 | Ashiura et al. ........... 525/332.8 |
| 7,262,250 | B2 | * | 8/2007 | Debaud et al. .............. 525/204 |
| 2004/0198920 | A1 | | 10/2004 | Debaud et al. |

FOREIGN PATENT DOCUMENTS

| GB | 1 535 039 | 12/1978 |
| JP | 11-49865 | 6/1989 |
| WO | WO 02/28946 | 4/2002 |

* cited by examiner

*Primary Examiner*—Robert D. Harlan
(74) *Attorney, Agent, or Firm*—Steven D. Boyd

(57) ABSTRACT

The invention relates to scorch prevention and, more specifically, to a composition which comprises a nitroxide and at least one organic peroxide and which can be used to delay scorching prior to crosslinking of thermoplastic compositions and/or elastomers. The invention also relates to a crosslinkable composition and to a crosslinking method.

12 Claims, No Drawings

SCORCH-DELAYING COMPOSITION

FIELD OF THE INVENTION

The present invention relates to the prevention of scorching before crosslinking of a thermoplastic and/or elastomeric composition by peroxides and its subject is more particularly a composition comprising a nitroxide and at least one organic peroxide which makes it possible to retard scorching.

BACKGROUND OF THE INVENTION

Premature crosslinking, which is called scorching, during the preparatory phase is a major difficulty in using peroxides in crosslinking (curing) applications of elastomeric and/or thermoplastic materials. The preparatory phase consists in general in blending the constituents and optionally extruding them, often at high temperatures. The operating conditions for this preparatory phase lead very often to the partial decomposition of the peroxide initiator, thus inducing the premature crosslinking reaction with formation of particles of gel within the mass of the mixture. The presence of these gel particles leads to imperfections (inhomogeneity, surface roughness) in the final product. Excessive scorching reduces the plastic properties of the material, such that it can no longer be transformed, which leads to the loss of the whole batch. In addition, excessive scorching can lead to the complete stoppage of the extrusion operation. Moreover, the organic peroxide scorching time obliges the user to carry out the blending at low temperatures, which imposes long mixing times.

To overcome this disadvantage, several solutions have been proposed. Thus, it has been proposed to use an initiator whose half-life time is long. The disadvantages of this approach are the low productivity due to a long curing time and the high energy costs.

It has also been proposed to incorporate certain additives in order to reduce the tendency towards scorching. Thus, the use of organic hydroperoxides as scorching inhibitors for compositions based on poly-ethylene crosslinked with a peroxide has been described in British patent GB 1 535 039. The use of vinyl monomers has been the subject of U.S. Pat. No. 3,954,907. The use of nitrites has been described in U.S. Pat. No. 3,202,648. U.S. Pat. No. 3,335,124 describes the use of aromatic amines, phenolic compounds, mercaptothiazole compounds, sulfides, hydroquinones and dialkyl dithia-carbamate compounds.

The use of the additives of the state of the art cited above to extend the time for withstanding scorching has however a harmful effect on the curing time and/or the final crosslinking density. It therefore leads to a decrease in the productivity and/or the properties of the final product.

In patent EP 0837 080, a process is described for grafting a functional monomer, in particular maleic anhydride, onto a thermoplastic polymer in the presence of a nitroxide, the role of which is to avoid crosslinking during the grafting operation.

International application WO 02/28950 describes scorch-retarding compositions comprising a nitroxide containing at least one unsaturation and an organic peroxide. The mass ratio of organic peroxide to nitroxide is between 1 and 50.

In the international application WO 02/28946, scorch-retarding compositions comprising a nitroxide, a crosslinking promoter and an organic peroxide are described.

In Japanese patent application JP 11-49865, additives of the nitroxide family have been described in compositions for retarding scorching during the crosslinking of polyethylene. These nitroxides correspond to general formula I:

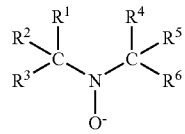

in which $R^1$, $R^2$, $R^5$ and $R^6$ represent an alkyl group of 1 to 4 carbon atoms and $R^3$ and $R^4$ represent an alkyl group of 1 to 4 carbon atoms or are linked and represent a group —$CH_2$—CHX—$CH_2$—, it being possible for X to be a hydroxyl, methoxy, cyano, phenylcarbonyloxy, carboxyl or methoxycarbonyl group.

The compounds 2,2,6,6-tetramethyl-1-piperidinyloxy (called TEMPO) and 4-hydroxy-2,2,6,6-tetramethyl-1-piperidinyloxy (called HTEMPO) are preferred because of their marked effect on the prevention on scorching.

The nitroxides of formula I are used in the form of a mixture with an organic peroxide. Among the 20 or so organic peroxides cited, dicumyl peroxide (also called DCP) and bis(α-tert-butylperoxyisopropyl)benzene in combination with a compound of general formula I are preferred as scorch-retarding agents.

The organic peroxide and the compound of general formula I are used in weight ratios ranging from 1:0.02 to 1:1 and advantageously from 1:0.1 to 1:0.5. Outside these ratios, if the content of compound of general formula I in terms of peroxide is less than 1:0.02, the scorch-reducing effect is less marked; if it is greater than 1:1, then an appreciable reduction in the cross-linking density is noted. The ratio by weight of organic peroxide normally represents between 0.3 and 5 parts per 100 parts by weight of polyethylene, and advantageously between 1 and 3 parts.

Thus, Table 1 of patent application JP 11-49865 shows that the addition, to 500 g of low-density poly-ethylene, of 12.5 g of DCP with 2.5 g (0.5%) or 5 g (1.0%) of TEMPO or HTEMPO makes it possible to increase the scorching time at 145° C. expressed in the form of time A (time necessary to reach 10% of the maximum pair) and time B (time necessary to reach the pair value of 0.4 kgf.cm), compared with the addition of 12.5 g of DCP alone.

Conversely, the addition, to 500 g of low-density poly-ethylene, of 12.5 g of DCP with 2.5 g (0.5%) or 5 g (1.0%) of TEMPO or HTEMPO, causes a very marked reduction in the crosslinking density expressed in the form of maximum pair value at 180° C. compared with the addition of DCP alone.

Although the use of these compounds during crosslinking brings about an extension of the scorch-resistance time, the reduction in the final crosslinking density represents a major disadvantage. Indeed, the cross-linking density is an indication of the mechanical properties of the final article. Thus, a reduction in the crosslinking density most probably indicates a reduction in the mechanical properties. It may be envisaged, in some cases, to compensate for this reduction in crosslinking density by an increase in the quantity of crosslinking system (peroxide), at the expense of the economic aspect and of the formation of larger quantities of decomposition products.

DETAILED DESCRIPTION OF THE INVENTION

Surprisingly, the applicant has discovered that this loss of crosslinking density may be avoided by using a lower quantity of nitroxide in a composition comprising a nitroxide and at least one organic peroxide. The combination of a nitroxide in a small proportion with at least one organic peroxide leads to a composition which makes it possible to retard scorching during the crosslinking of thermoplastic and/or elastomeric compositions by peroxides, without a harmful effect on the final crosslinking density. It thus makes it possible to obtain curing/crosslinking compositions leading to good properties of the final product with a high productivity. Moreover, the presence of residual nitroxide in the crosslinked rubber article confers on this article increased resistance to ageing.

The subject of the present invention is therefore a scorch-retarding composition comprising a nitroxide and at least one organic peroxide, characterized in that the organic peroxide(s) is(are) used in weight ratios ranging from 1:0.01 to 1:0.1 relative to the quantity of nitroxide present.

Advantageously, the peroxide(s) is(are) used in weight ratios ranging from 1:0.025 to 1:0.075 relative to the quantity of nitroxide present.

Advantageously, the peroxide(s) is(are) used in weight ratios ranging from 1:0.03 to 1:0.05 relative to the quantity of nitroxide present.

The nitroxide is chosen from the group consisting of 2,2,6,6-tetramethyl-1-piperidinyloxy (generally marketed under the name TEMPO), 4-hydroxy-2,2,6,6-tetramethyl-1-piperidinyloxy (generally marketed under the name 4-hydroxy-TEMPO), 4-methoxy-2,2,6,6-tetramethyl-1-piperidinyloxy (commonly called 4-methoxy-TEMPO), 4-oxo-2,2,6,6-tetramethyl-1-piperidinyloxy (commonly called 4-oxo-TEMPO), 2,2,5,5-tetramethyl-1-pyrrolidinyloxy, bis(1-oxyl-2,2,6,6-tetramethyl-piperidin-4-yl)sebacate (marketed under the trade mark CXA 5415 by the company Ciba Specialty Chemical), 1-piperidinyloxy-4,4'-(1,10-dioxo-1,10-decanediyl)bis-(oxy))bis(2,2,6,6-tetramethyl-) (commonly called di-TEMPO sebacate), 2,2,6,6-tetramethyl-4-hydroxy-piperidine-1-oxyl monophosphonate, 3-carboxy-2,2,5,5-tetramethylpirrolidinyloxy (commonly called 3-carbox proxyl).

Nitroxides such as 4-hydroxy-TEMPO and di-TEMPO sebacate are particularly preferred.

The organic peroxide(s) is(are) chosen from dicumyl peroxide, 1,3-1,4-bis(tert-butylperoxyisopropyl)-benzene; 1,1'-di(tert-butylperoxy)-3,3,5-trimethyl-cyclohexane; n-butyl-4,4'-di(tert-butylperoxy)valerate; 2,5-dimethyl-2,5-di(tert-butylperoxy)hexane.

Organic peroxides such as 1,3-1,4-bis(tert-butylperoxyisopropyl)benzene, 1,1'-di(tert-butylperoxy)-3,3,5-trimethylcyclohexane, or n-butyl-4,4'-di(tert-butylperoxy)valerate are particularly preferred.

According to one embodiment, the composition comprises 1,3-1,4-bis(tert-butylperoxyisopropyl)benzene and 4-hydroxy-TEMPO in a mass ratio ranging from 1:0.01 to 1:0.1, preferably from 1:0.025 to 1:0.075.

According to one embodiment, the composition comprises 1,3-1,4-bis(tert-butylperoxyisopropyl)benzene and di-TEMPO sebacate in a mass ratio ranging from 1:0.01 to 1:0.1, preferably from 1:0.025 to 1:0.075.

According to one embodiment, the composition comprises 1,1'-di(tert-butylperoxy)-3,3,5-trimethylcyclohexane and 4-hydroxy-TEMPO in a mass ratio ranging from 1:0.01 to 1:0.1, preferably from 1:0.025 to 1:0.075.

According to one embodiment, the composition comprises n-butyl-4,4'-di(tert-butylperoxy)valerate and 4-hydroxy-TEMPO in a mass ratio ranging from 1:0.01 to 1:0.1, preferably from 1:0.025 to 1:0.075.

According to one embodiment, the composition comprises n-butyl-4,4'-di(tert-butylperoxy)valerate and di-TEMPO sebacate in a mass ratio ranging from 1:0.01 to 1:0.1, preferably from 1:0.025 to 1:0.075.

Before their use, the compositions according to the invention may be mixed with a crosslinking promoter chosen from the group consisting of compounds containing at least one double bond which may be bifunctional or polyfunctional, such as for example bifunctional vinyl monomers, bifunctional allyl monomers, polyfunctional vinyl monomers or polyfunctional allyl monomers. These compounds are described in international application WO 02/28946 and make it possible to accelerate the crosslinking rate with no negative impact on the scorch resistance or on the crosslinking density.

The compositions according to the invention may advantageously be used to control the crosslinking in a process for crosslinking a thermoplastic and/or elastomeric polymer which may be crosslinked by means of a peroxide.

The present invention also provides a crosslinkable composition comprising a thermoplastic polymer and/or an elastomeric polymer which may be crosslinked by means of a peroxide, a nitroxide and at least one organic peroxide, the quantity by weight of organic peroxide(s) ranging from 1:0.01 to 1:0.1 relative to the quantity of nitroxide present, preferably from 1:0.025 to 1:0.075.

The organic peroxide(s) preferably represent(s) between 0.2 and 5 parts, and advantageously between 1 and 4 parts per 100 parts by weighs of polymer. The nitroxide and the peroxides are preferably those used for the scorch-retarding composition.

The crosslinkable composition may additionally contain a crosslinking promoter as defined above.

The present invention also provides a method for crosslinking a crosslinkable composition comprising a thermoplastic polymer and/or an elastomeric polymer which may be crosslinked by means of a peroxide in which the said polymer is mixed in the presence of a nitroxide and at least one organic peroxide, the quantity by weight of organic peroxide(s) ranging from 1:0.01 to 1:0.1 relative to the quantity of nitroxide present, preferably from 1:0.025 to 1:0.075, thus making it possible to control the crosslinking.

The present invention also provides molded or extruded objects such as electric cables or wires obtained from a crosslinkable composition defined above.

The thermoplastic and/or elastomeric polymers taken into consideration in the present invention may be defined as natural or synthetic polymers which have a thermoplastic and/or elastomeric character and which may be crosslinked (cured) under the action of a cross-linking agent. The crosslinking action and crosslinkable polymers are described in *Rubber World*, "Elastomer Crosslinking with Diperoxyketals", October 1983, pages 26-32, and in *Rubber and Plastic News*, "Organic Peroxides for Rubber Crosslinking", 29 Sep. 1980, pages 46-50. Polyolefins which are suitable for the present invention are described in *Modern Plastics Encyclopedia* 89, pages 63-67, 74-75. By way of example of polymers and/or elastomers, there may be mentioned low density linear polyethylene, low density polyethylene, high density polyethylene, chlorinated polyethylene, ethylene-propylene-(diene terpolymers (EPDM), ethylene-vinyl acetate copolymers, ethylene-propylene copolymers, silicone rubber, natural rubber (NR), polyisoprene (IR), polybutadiene (BR) acrylonitrile-butadiene copolymers (NBR), styrene-butadiene copolymers (SBR), chlorosulfonated polyethylene or fluoroelastomers.

There may also be mentioned ethylene-methyl (meth)-acrylate copolymers and ethylene-glycidyl methacrylate copolymers.

In addition to the constituents mentioned above, the scorch-retarding compositions and the crosslinkable compositions according to the invention may comprise antioxidants, stabilizers, plasticizers and inert fillers such as silica, clay or calcium carbonate.

According to the method of the present invention, the crosslinking temperature is between 140 and 250° C. and preferably between 160 and 220° C.

Advantageously, the crosslinking method is carried out in the presence of a nitroxide and at least one organic peroxide as defined for the crosslinkable composition.

The conversion of the crosslinkable compositions into molded or extruded objects may be carried out during or after the crosslinking.

The following examples illustrate the present invention without however limiting the scope thereof.

EXAMPLES

In the examples, the following abbreviations are used:
EPDM: ethylene-propylene-diene terpolymer marketed by Enichem
OHT: 4-hydroxy-TEMPO
SDT: di-TEMPO sebacate
Luperox F: 1,3-1,4-bis(tert-butylperoxyisopropyl)-benzene
Luperox 230: n-butyl-4,4'-di(tert-butylperoxy)valerate
Luperox 231: 1,1'-di(tert-butylperoxy)-3,3,5-trimethyl-cyclohexane
Luperox 101: 2,5-dimethyl-2,5-di-(tert-butylperoxy)-hexane The crosslinking density ($M_H$) and the crosslinking time ($t_{90}$) for the mixtures tested were measured at 170 or 180° C. with the aid of a Monsanto ODR 2000 E rheometer (Alpha Technologies, are of oscillation 3°, oscillation frequency 100 cycles/min).

The scorching time ($t_{s5}$) was measured at 110 or 130° C. with the aid of a Mooney MV 2000 viscometer (Alpha Technologies).

$M_H$: maximum value for the pair obtained from the curve recorded by the rheometer expressed as N.m. It indicates the level of crosslinking density.

$t_{90}$: time necessary to reach 90% of the maximum pair. It is the crosslinking time expressed as min:s.

$t_{s5}$: time necessary for a given temperature for the nominal pair to increase by 5 Mooney units. It is the scorching time expressed as min:s. The temperatures selected are those at which the compounding operation typically occurs, namely 130° C. for Luperox F and Luperox 101, and 110° C. for Luperox 231 and Luperox 230.

The examples are all carried out according to the following procedure:

300 g of EPDM compound are mixed in the presence of a crosslinking system in a roller-type mixer at 80° C. for 5 minutes. The organic peroxide and nitroxide contents are expressed in parts or milliparts by weight per 100 parts by weight of polymer (phr or mphr). The sample is then placed in the rheometer or viscometer chamber in order to carry out the measurements of $M_H$, $t_{90}$ and $t_{s5}$.

The results are given in Table 1.

TABLE 1

| Example | Crosslinking system in parts per 100 parts of polymer | | Crosslinking density $M_H$ (n·m) | Crosslinking time $t_{90}$ (min:s) | Scorching time $t_{s5}$ (min:s) |
|---|---|---|---|---|---|
| | Quantity of peroxide (phr) | Quantity of nitroxide (mphr) | | | |
| 1 (comp) | 3.2 Luperox F | — | 2.8 | 5:02 | 6:52 |
| 2 | 3.2 Luperox F | 80 OHT | 2.8 | 5:03 | 16:20 |
| 3 | 3.2 Luperox F | 230 OHT | 2.7 | 5:05 | 29:11 |
| 4 | 3.2 Luperox F | 110 SDT | 2.7 | 5:01 | 19:25 |
| 5 (comp) | 2.7 Luperox 101 | — | 2.3 | 6:30 | 7:55 |
| 6 | 2.7 Luperox 101 | 80 OHT | 2.3 | 6:33 | 18:24 |
| 7 | 2.7 Luperox 101 | 110 SDT | 2.3 | 6:28 | 19:54 |
| 8 (comp) | 4 Luperox 231 | — | 2.0 | 0:56 | 2:26 |
| 9 | 4 Luperox 231 | 80 OHT | 2.0 | 0:56 | 6:28 |
| 10 | 4 Luperox 231 | 110 SDT | 2.0 | 0:59 | 7:45 |
| 11 (comp) | 4 Luperox 230 | — | 2.1 | 3:00 | 6:52 |
| 12 | 4 Luperox 230 | 80 OHT | 2.1 | 3:02 | 28:26 |
| 13 | 4 Luperox 230 | 110 SDT | 2.1 | 3:05 | 33:06 |

The measurements of $M_H$ and $t_{90}$ were carried out at 180° C. for Examples 1 to 7, and at 170° C. for Examples 8 to 13.

The invention claimed is:

1. A scorch-retarding composition comprising a nitroxide and at least one organic peroxide, characterized in that the organic peroxide is selected from 1,3-1,4-bis(tert-butylperoxyisopropyl)benzene, 1,1'-di(tert-butylperoxy)-3,3,5-trimethylcyclohexane or n-butyl-4,4'-di(tert-butylperoxy)valerate and the weight ratio of organic peroxide to nitroxide present ranges from 1:0.01 to 1:0.1.

2. The composition as claimed in claim 1, characterized in that the organic peroxide is present in a weight ratio ranging from 1:0.025 to 1:0.075 relative to the quantity of nitroxide present.

3. The composition as claimed in claim 1, characterized in that the nitroxide is selected from 2,2,6,6-tetramethyl-1-piperidinyloxy, 4-hydroxy-2,2,6,6-tetramethyl-1-piperidinyloxy, 4-methoxy-2,2,6,6-tetramethyl-1-piperidinyloxy, 4-oxo-2,2,6,6-tetramethyl-1-piperidinyloxy, 2,2,5,5-tetramethyl-1-pyrrolidinyloxy, bis(1-oxyl-2,2,6,6-tetramethylpiperidin-4-yl)sebacate, 1-piperidinyloxy-4,4'-(1,10-dioxo-1,10-decanediyl)bis(oxy))bis(2,2,6,6-tetramethyl-), 2,2,6,6-tetramethyl-4-hydroxypiperidine-1-oxyl monophosphonate, or 3-carboxy-2,2,5,5-tetra-methylpirrolidinyloxy.

4. The composition as claimed in claim 1, characterized in that the nitroxide is selected from 4-hydroxy 2,2,6,6-tetramethyl-1-piperidinyloxy or 1-piperidinyloxy-4,4'-(1,10-dioxo-1,10-decanediyl)bis(oxy))bis(2,2,6,6-tetramethyl-).

5. The composition as claimed in claim 1, characterized in that it additionally comprises a thermoplastic polymer and/or an elastomeric polymer which may be crosslinked by means of a peroxide.

6. The composition as claimed in claim 5, characterized in that the peroxide represents between 0.2 and 5 parts by weight of polymer.

7. The composition as claimed in claim 5, characterized in that the polymer is selected from low density linear polyethylene, low density poly-ethylene, high density polyethylene, chlorinated polyethylene, ethylene-propylene-diene terpolymers (EPDM), ethylene-vinyl acetate copolymers, ethylene-propylene copolymers, silicone rubber, natural rubber (NR), polyisoprene (IR), polybutadiene (BR) acrylonitrile-butadiene copolymers (NBR), styrene-butadiene copolymers (SBR), chlorosulfonated polyethylene or fluoroelastomers, ethylene-methyl (meth)acrylate copolymers or ethylene-glycidyl methacrylate copolymers.

8. A method for crosslinking a crosslinkable composition comprising a thermoplastic polymer and/or an elastomeric polymer which may be crosslinked by means of a peroxide, in which the said polymer is mixed in the presence of a nitroxide and at least one organic peroxide, chosen from 1,3-1,4-bis(tert-butylperoxyisopropyl)benzene, 1,1'-di(tert-butylperoxy)-3,3,5-trimethylcyclohexane or n-butyl-4,4'-di(tert-butylperoxy)valerate, the quantity by weight of organic peroxide ranging from 1:0.01 to 1:0.1 relative to the quantity of nitroxide present.

9. The method as claimed in claim 8, characterized in that the mixture is prepared at a temperature of between 140 and 250° C.

10. The method as claimed in claim 8, characterized in that the conversion into molded or extruded objects is carried out during or after the crosslinking.

11. The composition as claimed in claim 5, characterized in that the peroxide represents between 1 and 4 parts per 100 parts by weight of polymer.

12. The method as claimed in claim 8, characterized in that the mixture is prepared at a temperature of 160 and 220° C.

* * * * *